(12) United States Patent
Bostick et al.

(10) Patent No.: US 10,146,799 B2
(45) Date of Patent: Dec. 4, 2018

(54) SAVING EVENTS INFORMATION IN IMAGE METADATA

(71) Applicant: International Business Machines Corporation, Armonk, NY (US)

(72) Inventors: James E. Bostick, Austin, TX (US); John M. Ganci, Jr., Cary, NC (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 693 days.

(21) Appl. No.: 14/530,819

(22) Filed: Nov. 2, 2014

(65) Prior Publication Data

US 2016/0124997 A1    May 5, 2016

(51) Int. Cl.
*G06F 17/00* (2006.01)
*G06F 17/30* (2006.01)

(52) U.S. Cl.
CPC .. *G06F 17/30268* (2013.01); *G06F 17/30312* (2013.01)

(58) Field of Classification Search
CPC ......... G06F 17/30312; G06F 17/30268; G06F 17/3082; H04N 21/47205; H04N 21/4725
See application file for complete search history.

(56) References Cited

U.S. PATENT DOCUMENTS

| | | | |
|---|---|---|---|
| 6,629,104 B1 * | 9/2003 | Parulski | G06F 17/30265 348/231.2 |
| 7,146,575 B2 * | 12/2006 | Manolis | G03D 15/005 707/E17.019 |
| 8,594,925 B2 | 11/2013 | Amer-Yahia et al. | |
| 8,626,699 B2 | 1/2014 | Xie et al. | |
| 8,745,499 B2 * | 6/2014 | Pendergast | G06F 3/0482 715/713 |
| 8,875,025 B2 * | 10/2014 | Ubillos | G11B 27/034 715/723 |
| 8,966,367 B2 * | 2/2015 | Meaney | G06F 3/048 715/716 |
| 2007/0291323 A1 | 12/2007 | Roncal | |
| 2011/0292221 A1 | 12/2011 | Gu et al. | |
| 2012/0113144 A1 | 5/2012 | Adhikari et al. | |

(Continued)

FOREIGN PATENT DOCUMENTS

WO       2012092150 A3       1/2013

OTHER PUBLICATIONS

O'Hare et al., Predicting Participants in Public Events using Stock Photos, MM'12, Oct. 29-Nov. 2, 2012, Nara, Japan.

(Continued)

*Primary Examiner* — Cheryl Lewis
(74) *Attorney, Agent, or Firm* — Garg Law Firm, PLLC; Rakesh Garg; Christopher K. McLane

(57) ABSTRACT

A method, system, and computer program product for saving events information in image metadata are provided in the illustrative embodiments. A first event is detected at a first time, using a processor and a memory in a device. Information related to the first event is collected. At a second time, the capturing of a first image is detected, the second time being later than the first time. The information related to the first event is associated with the first image as first metadata of the first image.

20 Claims, 7 Drawing Sheets

(56) References Cited

U.S. PATENT DOCUMENTS

2013/0036117 A1    2/2013  Fisher et al.
2014/0033041 A1*   1/2014  Lyons .................... G06F 3/048
                                                      715/723

OTHER PUBLICATIONS

Yen et al., Knowledge discovery for better photographs, 2007.
Anonymous; A System and Method for Providing Meta-data Model Based Distributed Data Validation, Feb. 3, 2012.
Tang et al., Event Classification from Photo Collections, 2010.

* cited by examiner

SAVING EVENTS INFORMATION IN IMAGE METADATA

TECHNICAL FIELD

The present invention relates generally to a method, system, and computer program product for enriching metadata associated with images. More particularly, the present invention relates to a method, system, and computer program product for saving events information in image metadata.

BACKGROUND

Photographs and videos are collectively referred to as images (singular, image) within the scope of this disclosure, unless expressly distinguished at the place of usage.

People capture images of their travels for later remembrance. An image captures a discrete place, people, or event that the person may be interested in at the time of capturing the photograph or video. Often, many more events transpire between the discrete times at which the images are captured.

An image has metadata associated therewith. Metadata of an image provides additional information about the image. For example, an image captured using a device that is equipped with a location module, such as a Global Positioning System (GPS) module, can record the location of the place where the image was captured. A device equipped with a clock can capture an image whose metadata records the date and time when the image was captured.

Many digital cameras can record the focal length, aperture, exposure setting, hue and saturation settings, filter settings, and other such image-specific or device-specific information as image metadata. Some devices can associate statically defined information with an image captured using the device, such as copyright information to identify the person or entity who owns the rights to that image.

SUMMARY

The illustrative embodiments provide a method, system, and computer program product for saving events information in image metadata. An embodiment includes a method for saving event information in image metadata. The embodiment detects, using a processor and a memory in a device, at a first time, a first event. The embodiment collects information related to the first event. The embodiment detects, at a second time, a first image being captured, the second time being later than the first time. The embodiment associates, as first metadata of the first image, the information related to the first event.

Another embodiment includes a computer program product for saving event information in image metadata. The embodiment further includes one or more computer-readable tangible storage devices. The embodiment further includes program instructions, stored on at least one of the one or more storage devices, to detect, using a processor and a memory in a device, at a first time, a first event. The embodiment further includes program instructions, stored on at least one of the one or more storage devices, to collect information related to the first event. The embodiment further includes program instructions, stored on at least one of the one or more storage devices, to detect, at a second time, a first image being captured, the second time being later than the first time. The embodiment further includes program instructions, stored on at least one of the one or more storage devices, to associate, as first metadata of the first image, the information related to the first event.

Another embodiment includes a computer system for saving event information in image metadata. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to detect, using a processor and a memory in a device, at a first time, a first event. The embodiment further includes program instructions, stored on at least one of the one or more storage devices for execution by at least one of the one or more processors via at least one of the one or more memories, to collect information related to the first event. The embodiment further includes program instructions, stored on at least one of the one or more storage devices for execution by at least one of the one or more processors via at least one of the one or more memories, to detect, at a second time, a first image being captured, the second time being later than the first time. The embodiment further includes program instructions, stored on at least one of the one or more storage devices for execution by at least one of the one or more processors via at least one of the one or more memories, to associate, as first metadata of the first image, the information related to the first event.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
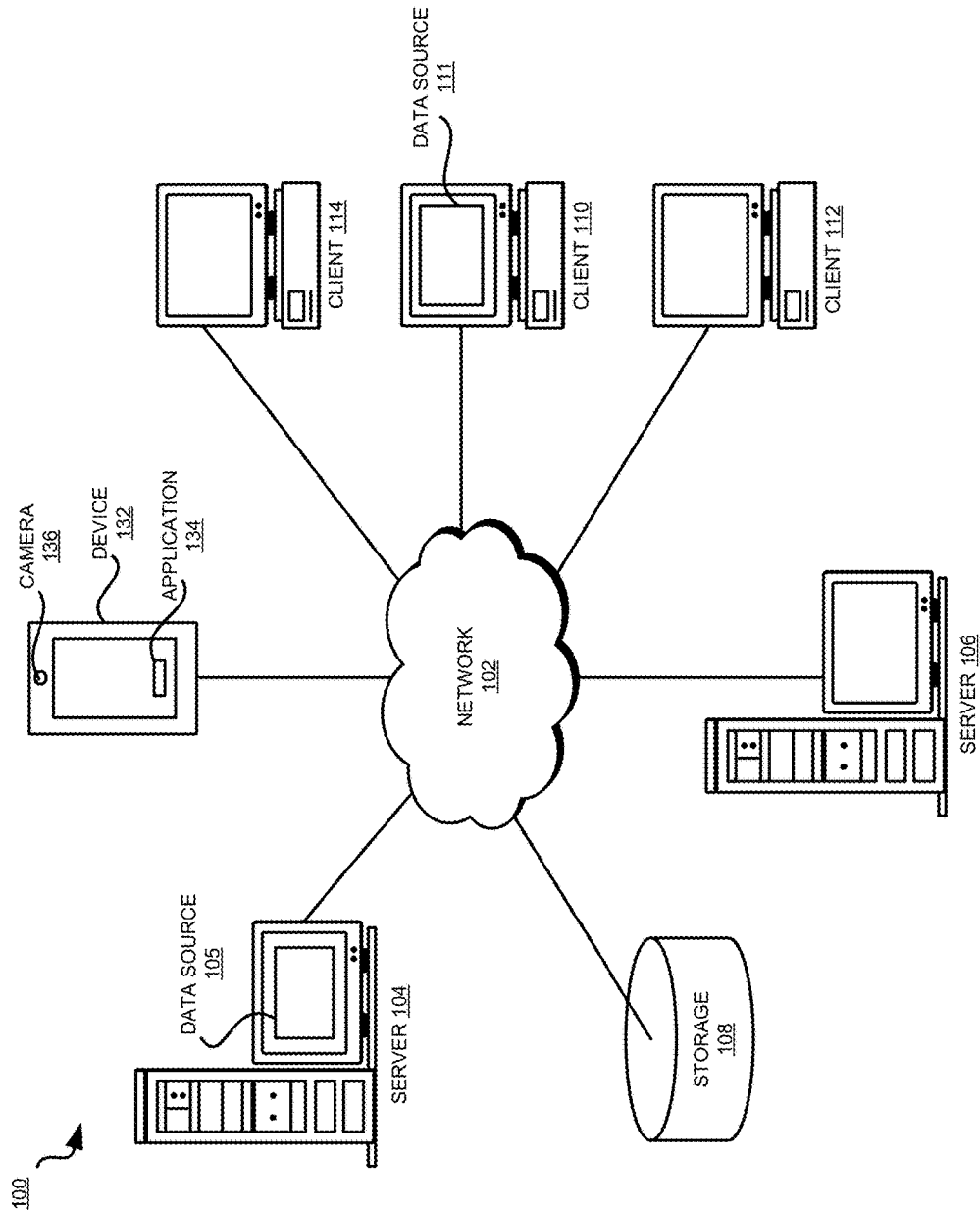
FIG. 1 depicts a block diagram of a network of data processing systems in which illustrative embodiments may be implemented.

Within the scope of the illustrative embodiments, a device used for capturing an image comprises a module configured to record photographic information, video information, or both. Furthermore, the device comprises data processing capabilities that can be operated to create and associate non-photographic or video information with the image. A camera, a camcorder, a smartphone, a tablet device, and a wearable mobile device are some non-limiting examples of devices contemplated within the scope of the illustrative embodiments.

Within the scope of the illustrative embodiments, an event is an occurrence of an activity at a time and a place, including but not limited to, and not necessarily at or related to, the time or place where an image is captured. For example, an example event within the scope of the illustrative embodiments may be a credit card transaction some time before, and/or at some place other than, the time or place of capturing of an image. Another example event within the scope of the illustrative embodiments may be an audio conversation some time before, and/or at some place other than, the time or place of capturing of an image.

Presently, images record the occurrences, people, places, or things at discrete place and time. The illustrative embodiments recognize that such discrete windows in the time continuum are often unsatisfactory for a variety of reasons. For example, a traveler wanting to document his or her travels captures images at discrete places and times during a particular journey. Those images, however, are unhelpful in helping the traveler recall the events that transpired between images.

For example, assume that a traveler visits Brussels, Belgium. The traveler visits the Musical Instruments Museum and captures an image there. The traveler then travels to Musee David et Alice van Buuren and captures another image there. While traveling from the Musical Instruments Museum to Musee David et Alice van Buuren, the traveler stops at a souvenir shop and purchases a souvenir, visits a bakery and converses with the proprietor about local pastries. The traveler, perhaps spends some time at a coffee shop, writes to a friend on social media about the sights and smells of Brussels that morning, and looks up information on the internet about an important exhibit to see at Musee David et Alice van Buuren. The traveler does not capture images to record the souvenir purchase, the bakery conversation, the coffee shop visit, the social media exchange, or the internet session.

Sometime after the traveler returns from Brussels, the traveler reviews the images. The illustrative embodiments recognize that the images help recall the visits to the Musical Instruments Museum and Musee David et Alice van Buuren, but contribute nothing if the traveler tries to recall what he or she bought at the souvenir shop purchase, the pastry the baker described, the ambience at the coffee shop that day, or the exhibit he or she wanted to visit. When the traveler has not captured images of each such event, for recalling such events, the traveler has to either rely on the traveler's memory, or try to search through notes, websites, or other information locations, where the information from that morning during that travel may or may not be preserved.

The illustrative embodiments used to describe the invention generally address and solve the above-described problems and other problems related to preserving the information of the events transpiring between discrete images. The illustrative embodiments provide a method, system, and computer program product for saving events information in image metadata.

An embodiment executes as an application in a device that is used for capturing images. The embodiment detects that certain events are transpiring since the time a previous image was captured, and no image is being captured of such events. The embodiment collects information available at the device about the event. The embodiment transforms the available information such that the transformed information can be associated with an image as image metadata.

The embodiment continues detecting the transpiring events, collecting their information, and transforming the information until the embodiment detects that a next image has been captured. When the next image is captured, the embodiment associates all the transformed information about the events that transpired since the previous image and whose information the embodiment collected. Operating in this manner, an embodiment preserves the information of events that occur between discrete images, and for which a user does not capture an image.

The types of events that an embodiment can detect are device dependent and configurable in an embodiment. For example, a device may be equipped with a payment module that allows the device to be used for making purchases and other financial transactions. When an embodiment executes in such a device, the embodiment can be configured to access the financial transaction information to detect financial events, and times, places, vendors, amounts, goods transacted, and other aspects of such financial events.

As another example, a device may be equipped with a browser or social media application that allows the device to be used for internet or social media interactions. When an embodiment executes in such a device, the embodiment can be configured to access the information about such interactions to detect interactive events, and times, places, sources, targets, contexts, communications, messages, search terms, and other aspects of such interactive events.

As another example, a device may be equipped with GPS or other location module that allows the device to be used for tracking the device's location. When an embodiment executes in such a device, the embodiment can be configured to access the location information to detect location events, and arrival times, departure times, duration of stays, places, location conditions, and other aspects of such location events.

As another example, a device may be equipped with a microphone or other audio module that allows the device to be used for audio interactions. When an embodiment executes in such a device, the embodiment can be configured to access the audio information to detect audio events, and times, durations, content, recording, speakers, language, context, noise levels, and other aspects of such audio events.

These example modules or capabilities of a device are not intended to be limiting on the illustrative embodiments. Similarly, the example manners in which various embodiments are described to use these capabilities are also not intended to be limiting on the illustrative embodiments. From this disclosure, those of ordinary skill in the art will be able to identify many other capabilities of a given device and manners of adapting an embodiment to capture events using those capabilities, and the same are contemplated within the scope of the illustrative embodiments.

Furthermore, an embodiment can be configured to use more than one capabilities of a given device to detect new or more complex events, to correlate one event with another, to acquire additional or different information about an event. For example, when an embodiment detects and audio event, the embodiment can use natural language processing capability, if available or accessible from the device, to identify the context, language, locale, emotion, and other aspects of the conversation. For example, if the tone of a conversation event appears to be confrontational, the embodiment can be configured to automatically turn on a camera capability of the device and capture an image.

A user can configure an embodiment to detect or not detect certain events. For example, if the user does not want the embodiment to detect credit card events, such events can be excluded from the scope of event detection by an embodiment through configuration.

Similarly, a user can configure an embodiment to adjust a level of detail in the information about certain detected events. For example, the user may want more details of a location recorded when the stay at the location exceeds a pre-defined period, but otherwise allow the embodiment to collect a default or another pre-determined amount of information about the stay.

An embodiment further operates to preserve the events information metadata in case the image is deleted or otherwise altered to remove or modify the image metadata. For example, assume that an embodiment had previously detected certain events and associated their information as metadata of an image that was captured sometime after that event. Sometime after the image was captured and placed into a collection, the image is selected in the collection either for deletion or for some manipulation that will alter the metadata of the image.

In such circumstances, an embodiment saves at least that portion of the image metadata that comprises the transformed information of the transpired events. The embodiment allows the deletion or other image manipulation to proceed. The embodiment identifies another image, which is chronologically the next image from the image that is being deleted or manipulated, in a chronological order in the collection. The embodiment associates the saved image metadata or a portion thereof with such next image. Thus, even if a discrete image is deleted or modified, the events that transpired between that image and the chronologically prior image is not lost.

Again, how the image metadata of transpired events is preserved is also configurable. For example, the user may decide that if n or more images are deleted, then the user does not wish to preserve the information of events that transpired in between either. Accordingly, the user can configure an embodiment to not save or re-associate the transpired events information when n consecutive images are deleted or manipulated.

The configuration of an embodiment can be accomplished in any suitable manner. For example, within the scope of the illustrative embodiments, any presently available technique for building a user interface on a given device can be used to build a user interface that allows a user to configure a particular implementation of an embodiment.

Similarly, the transpired events information in the image metadata can be reviewed or edited in any suitable manner. For example, within the scope of the illustrative embodiments, any presently available technique for building a user interface on a given device or data processing system can be used to build a user interface that allows a user to review or manipulate the image metadata resulting from a particular implementation of an embodiment.

A method of an embodiment described herein, when implemented to execute on a device or data processing system, comprises substantial advancement of the functionality of that device or data processing system in preserving information of events not captured as images. For example, the illustrative embodiments enable the device or data processing system, e.g., a mobile device, to detect events while an image is not being captured, collect information descriptive of such events, and associate the collected information with a next image, as image metadata, whenever the next image is captured. The illustrative embodiments further enable the data processing system or device to preserve the image metadata even when the image is deleted or modified, by saving the image metadata and associating the saved image metadata with another image. Such manner of capturing and preserving information about events that transpire between image captures is unavailable in presently available devices or data processing systems. Thus, a substantial advancement of such devices or data processing systems by executing a method of an embodiment comprises saving events information in image metadata, thereby avoiding loss of such events information or the need to unreliably piece together the events information from diverse sources, by using such improved data processing systems or devices.

The illustrative embodiments are described with respect to certain images, metadata, events, modules, capabilities, image ordering, image collections, transformations, techniques, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
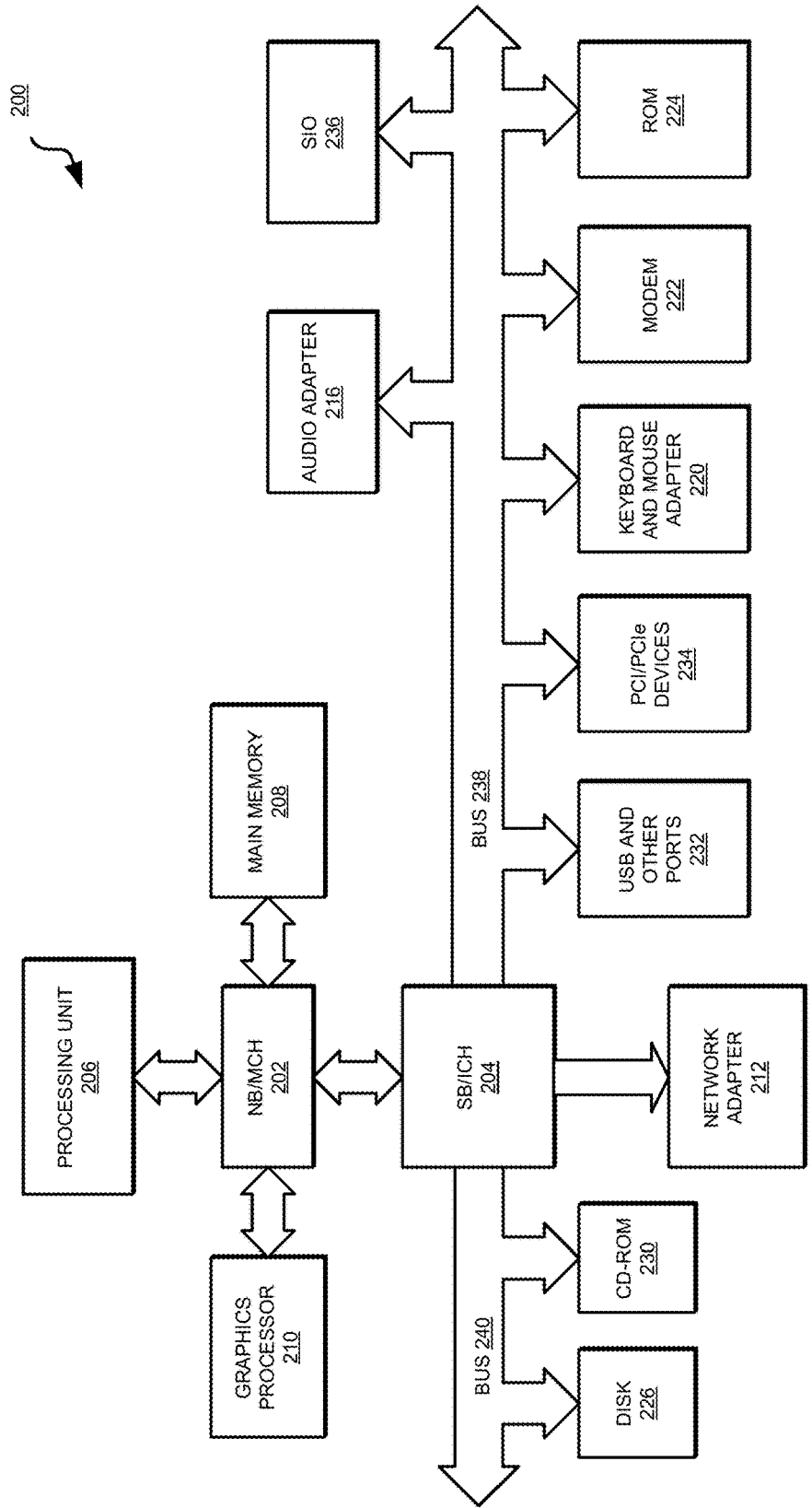
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for capturing images, such as by using camera module 136, and processing image metadata as described herein. Application 134 implements an embodiment described herein. Data source 105 may be a source of information external to device 132, from which application 134 may collect information relating to an event. As a non-limiting example, source 105 may be a web server. Similarly, data source 111 may be another one of any number of sources of information external to device 132, from which application 134 may collect information relating to an event. As a non-limiting example, source 111 may be a social media server or a weather information service.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
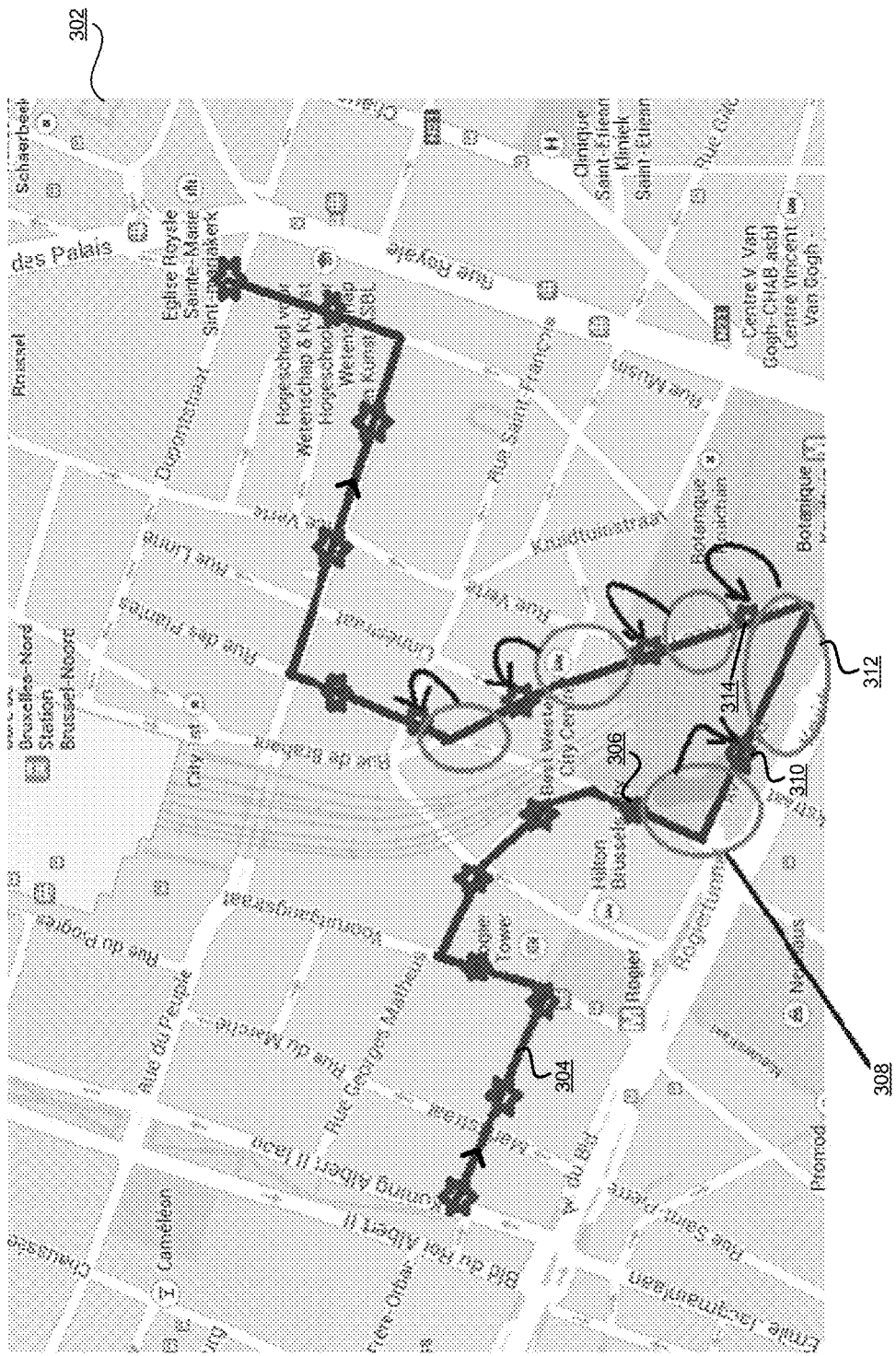
FIG. 3 depicts a conceptual representation of saving events information in image metadata in accordance with an illustrative embodiment.

With reference to FIG. 3, this figure depicts a conceptual representation of saving events information in image metadata in accordance with an illustrative embodiment. Map 302 represents an example travel expedition during which events are captured and their information is preserved by an embodiment.

For example, device 132 of FIG. 1, having application 134 executing therein, traverses path 304. Along path 304 device 132 is used to capture images at locations marked as stars. For example, device 132 captures an image at location 306 at a first time, and another image at location 310 at a second time.

Travel segment 308 lies between the locations of images 306 and 310. Device 132 traverses segment 308 during the period between the first time and the second time. The events or occurrences during the traversal of segment 308 are not captured by device 132 in images.

According to an embodiment, application 134 in device 132 detects such events during the traversal of segment 308. Application 134 collects information about such events, which may be available in device 132 or from device 132, e.g., by accessing sources 105 or 111 from device 132.

Application 134 transforms the information collected for each such event. One example of the transformation may be to retain only a portion of the information collected about an event and discarding the rest of the collected information about the event. Another example transformation may be to rearrange an order of data in the collected information about an event. Another example transformation may be to reformat data attribute in the collected information about an event. Another example transformation may be to compress, encode, or encrypt, the data in the collected information about an event. Another example transformation may be to tag certain data in the collected information about an event.

These example transformations are not intended to be limiting on the illustrative embodiments. From this disclosure, those of ordinary skill in the art will be able to conceive many other transformations that might be suitable in particular implementations of the various embodiments, and the same are contemplated within the scope of the illustrative embodiments. In some cases, a transformation may not be needed, and application 134 may use the collected information as transformed information without performing any transformation.

Application 134 waits for image 310 to be captured. After device 132 has captured image 310, application 134 associates the transformed information of one or more detected events with image 310 in the form of image metadata of image 310. If the transformed information of only some of the detected events is to be associated as image metadata with image 310, application 134 selects such events and their corresponding transformed information according to a configuration.

Likewise, device 132 captures another image at location 314 at a third time. Travel segment 312 lies between the locations of images 310 and 314. Device 132 traverses segment 312 during the period between the second time and the third time. The events or occurrences during the traversal of segment 312 are not captured by device 132 in images. Application 134 detects such events, collects their information, transforms the collected information, and associates all or some of the transformed information with image 314 as image metadata upon the capturing of image 314.

Application 134 can be configured or instructed to begin performing the operation described between the place and time of image 306 and the place and time of image 310 from any place and time in path 304. Application 134 performs the operation described between the place and time of image 306 and the place and time of image 310, and the place and time of image 310 and the place and time of image 314, for any number of travel segments between images. Application 134 can be configured or instructed to stop, pause, or reinitiate, performing the operation described between the place and time of image 306 and the place and time of image 310 at any place and time in path 304.

Figure 4:
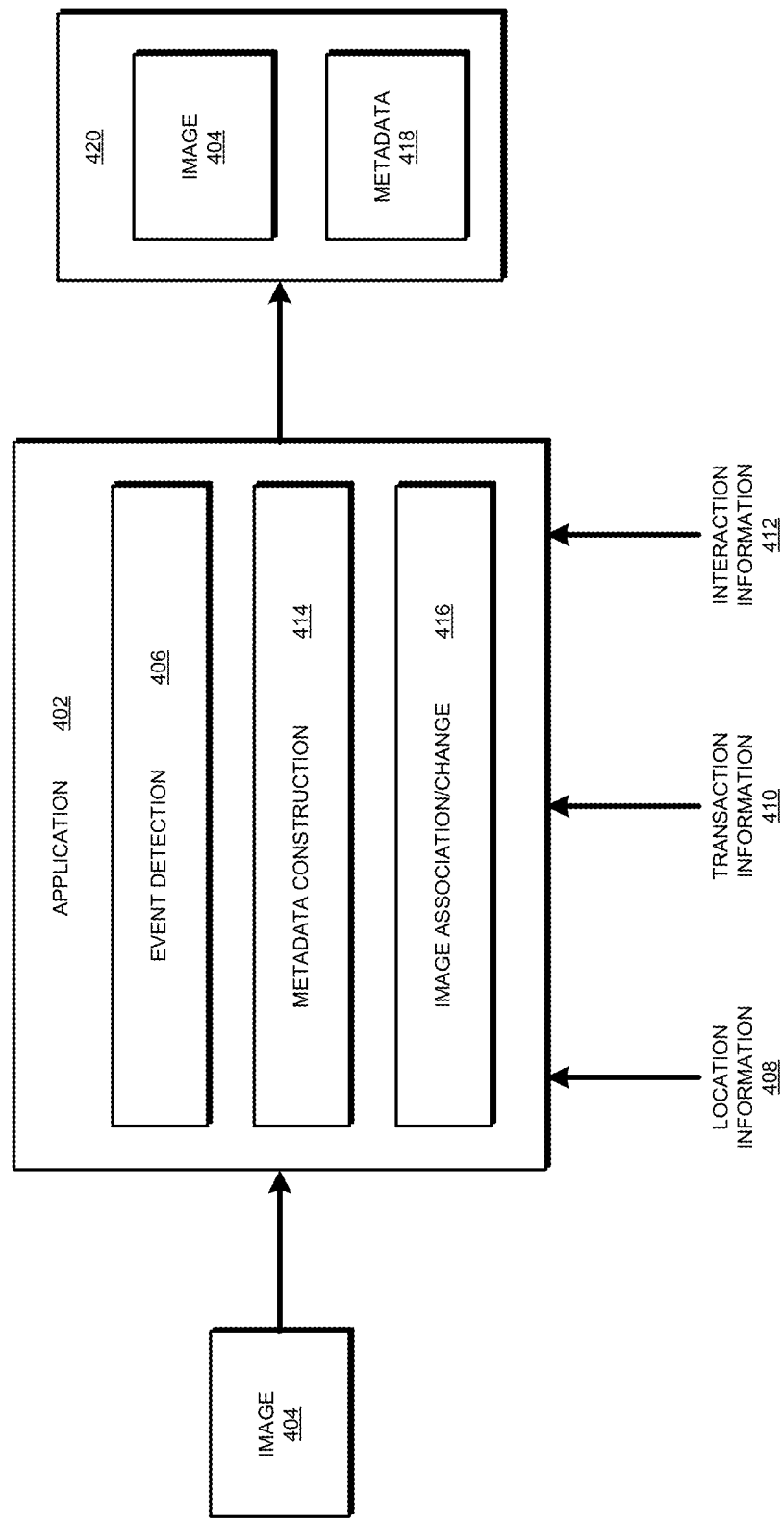
FIG. 4 depicts a block diagram of an example configuration of an application for saving events information in image metadata in accordance with an illustrative embodiment.

With reference to FIG. 4, this figure depicts a block diagram of an example configuration of an application for saving events information in image metadata in accordance with an illustrative embodiment. Application 402 is an example of application 134 in FIG. 1.

At time T1, application 402 begins to detect events, collecting their information, and transforming the collected information. Sometime after time T1, at time T2, application 402 detects that image 404 has been captured. Time T1 may be the time of capturing of a previous image (not shown), or an arbitrary time before time T2, such as a time when a user begins using application 402.

Component 406 detects the events that transpire beginning at T1 and up to T2. For such an event, for example, event E1, component 406 receives, requests, accesses, or otherwise collects information related to event E1. For example, a location module in the device where application 402 is executing provides location information 408. Location information 408 provides component 406 the location of event E1.

As another example, a transactional capability in the device where application 402 is executing provides transaction information 410. For example a transaction of some type may be related to event E1, or another event E2 might transpire during interval T1-T2 that might be transactional.

As another example, an interactive capability in the device where application 402 is executing provides interaction information 410. For example an interaction of some type may be related to event E1, or another event E3 might transpire during interval T1-T2 that might comprise an interaction of some type. Some non-limiting examples of the transactions and interactions are described elsewhere in this disclosure.

Component 414 transforms the collected information into transformed information. The transformed information is suitable for use as image metadata. Several non-limiting examples of transformations are provided elsewhere in this disclosure. No limitations are placed by the illustrative embodiments on the types of transformation that may be needed to produce transformed information that conforms to a given image metadata specification in a given implementation.

Component 416 associates the transformed information with image 404 in the forms of image metadata 418. The combination 420 of image 404 and image metadata can be stored in any data storage location and in any manner suitable for a given implementation.

Figure 5:
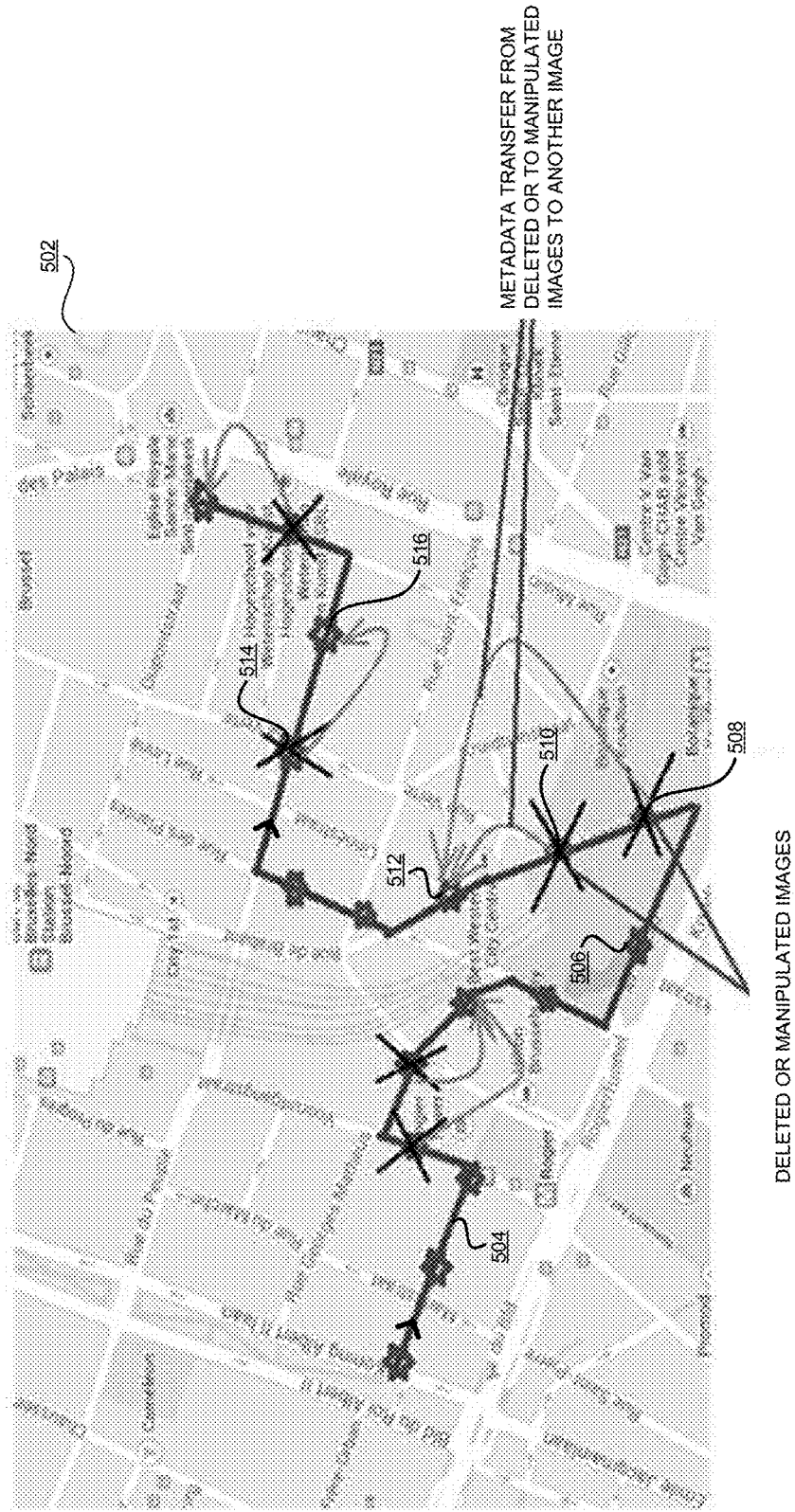
FIG. 5 depicts conceptual representation of changing image metadata association in accordance with an illustrative embodiment.

Component 416 also detects image changes that affect image metadata 418. For example, when image 404 is deleted or otherwise manipulated such image metadata 418 may be lost, deleted, removed, truncated, or otherwise affected, component 416 saves image metadata 418. Component 416 associates the saved image metadata 418 with another image (not shown), such as an image captured at time T3, time T3 occurring after time T2. FIG. 5 provides an example of the association changing process.

With reference to FIG. 5, this figure depicts conceptual representation of changing image metadata association in accordance with an illustrative embodiment. Map 502 is similar to map 302 in FIG. 3, and represents a similar example travel expedition. Path 504 is similar to path 304 in FIG. 3.

Assume that images were captured on path 504 at the locations identified with star markings. As described with respect to FIGS. 3 and 4, application 402 of FIG. 4 detected certain events transpiring on the travel segments between star markings, and associated image metadata containing information about those events with the image captured at the end of the respective segments.

For example, the segment beginning after image 506 and ending at the image 508 has the events information associated with image 508 as image metadata. Similarly, the segment beginning after image 508 and ending at the image 510 has the events information associated with image 510 as image metadata. Likewise, the segment beginning after image 510 and ending at the image 512 has the events information associated with image 512 as image metadata. The segment beginning after image 514 and ending at the image 516 has the events information associated with image 516 as image metadata.

Assume that images 506, 508, 510, 512, 514, and 516, along with other images from path 504 are in a collection, arranged in a chronological order according to the travel on path 504. Further assume that the user decides to delete or otherwise manipulate images 508 and 510 such that their respective image metadata, as associated with those images by application 402 of FIG. 4, will be removed or affected. In such a case, component 416 of application 402 saves the metadata of images 508 and 510, and locates image 512 in the collection as the next image after the deleted images. Component 416 associates the image metadata of images 508 and 510 with image 512.

Similarly, the user may decide to delete or otherwise manipulate image 514 such that the image metadata, as associated with image 514 by application 402 of FIG. 4, will be removed or affected. In such a case, component 416 of application 402 saves the metadata of image 514, and locates image 516 in the collection as the next image after the deleted images. Component 416 associates the image metadata of images 514 with image 516.

Figure 6:
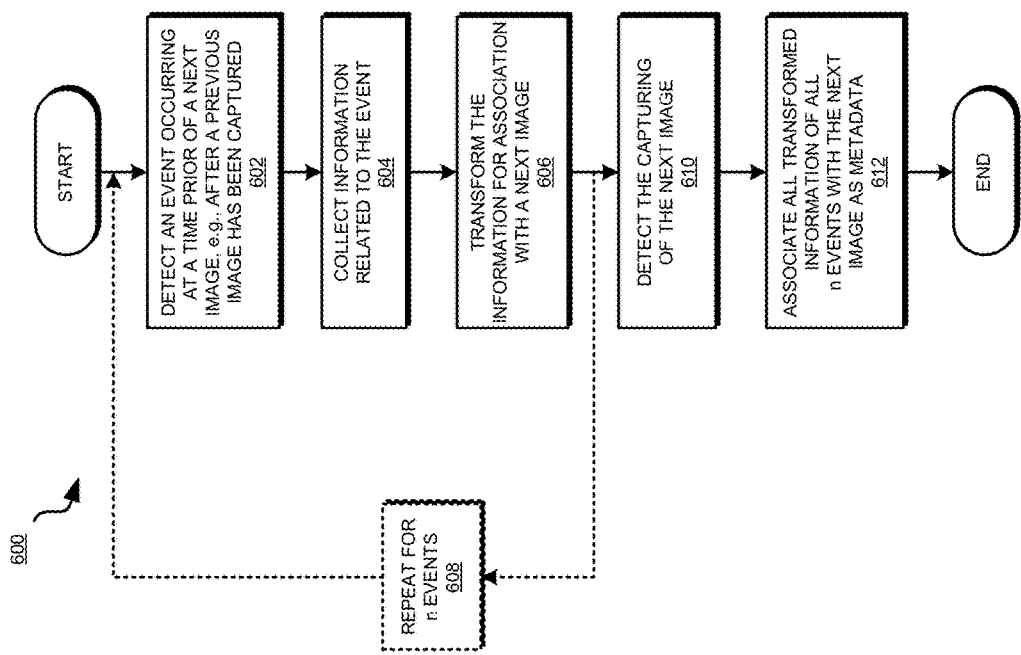
FIG. 6 depicts a flowchart of an example process for saving events information in image metadata in accordance with an illustrative embodiment; an FIG. 7 depicts a flowchart of an example process for re-associating image metadata of one image with another image in accordance with an illustrative embodiment.

With reference to FIG. 6, this figure depicts a flowchart of an example process for saving events information in image metadata in accordance with an illustrative embodiment. Process 600 can be implemented in application 402 in FIG. 4.

The application detects an event that the application is configured to detect. The application detects the event at a certain time before a next image is captured, for example, at a time after a previous image has been captured (block 602). The application collects information related to the event (block 604).

The application transforms the collected information, or in some cases regards the collected information as transformed information, for associating with a next image when the next image is captured (block 606). The application repeats blocks 602, 604, and 606 as many times as the number of detected events (block 608). For example, the application may detect n events of types that the application is configured to detect. Accordingly, the application repeats blocks 602, 604, and 606 n times.

The application detects the capturing of the next image (block 610). The application associates the transformed information of the n events with next image as the next image's metadata (block 612). The application ends process 600 thereafter.

Figure 7:
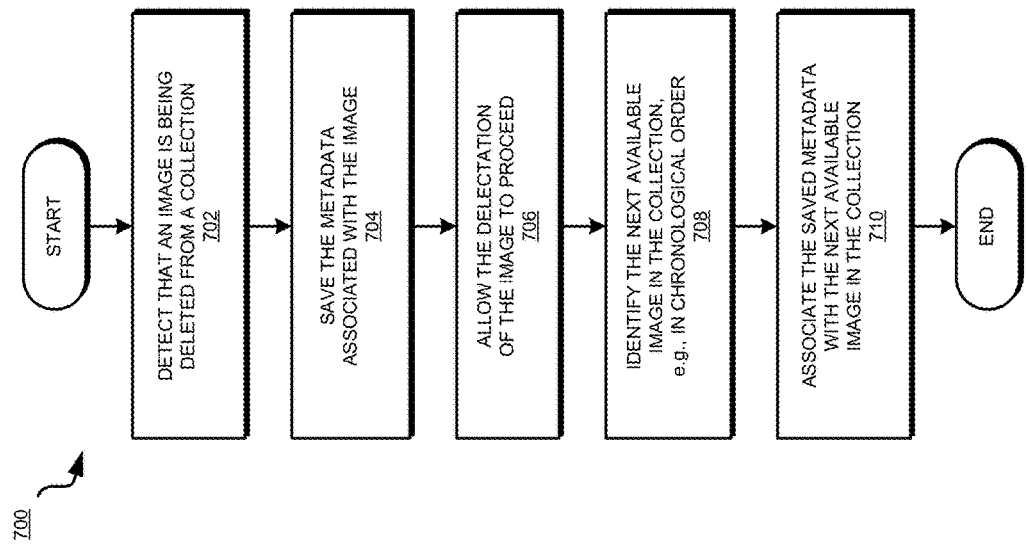

With reference to FIG. 7, this figure depicts a flowchart of an example process for re-associating image metadata of one image with another image in accordance with an illustrative embodiment. Process 700 can be implemented in application 402 in FIG. 4.

The operation is described with respect to deletion of an image only as an example. Other non-limiting example ways of manipulating an image in a collection are described elsewhere in this disclosure. From this disclosure, those of ordinary skill in the art will be able to identify other ways of manipulating an image, which affects the image metadata in such a manner that the application triggers process 700.

The application detects that an image is being deleted, is selected for deletion, or is about to be deleted from a collection (block 702). The application saves that metadata of the image which contains the events information (block 704). For example, the application saves that metadata that was associated with the image by process 600 in FIG. 6.

The application allows the deletion of the image to proceed (block 706).

The application identifies the next available image in the collection that is not being deleted (block 708). The application associates the saved metadata with the next available image in the collection (block 710). The application ends process 700 thereafter.

Thus, a computer implemented method, system or apparatus, and computer program product are provided in the illustrative embodiments for saving events information in image metadata. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for saving event information in image metadata, the method comprising:
   detecting, using a processor and a memory in a device, at a first time, a first event, the first event being a non-photographic event, and the first time being a time when no image capturing activity is occurring using the device;
   collecting information related to the first event;
   detecting, at a second time, a first image being captured by the device, the second time being later than the first time, and wherein the first image is chronologically a next discrete image to be captured after the event has transpired; and
   associating, as first metadata of the first image, the information related to the non-photographic first event, wherein the first metadata is unrelated to a content of the first image, wherein the first image also has a second metadata of information related to the content of the first image, the second metadata being created by an image capturing technology.

2. The method of claim 1, further comprising:
   determining that the first image is selected for a manipulation that modifies the first metadata;
   saving the first metadata of the first image;
   identifying a second image, wherein the second image is captured at a third time, the third time being later than the second time; and
   associating the first metadata of the first image with the second image.

3. The method of claim 2, wherein the manipulation comprises deletion, and wherein the deletion of the first image deletes the first metadata.

4. The method of claim 2, further comprising:
   detecting a second event, wherein the second event occurs after the second time and before the third time;
   associating information related to the second event as second metadata of the second image.

5. The method of claim 4, further comprising:
   determining that the second image is selected for a manipulation that modifies the second metadata;
   saving the first metadata of the first image and the second metadata of the second image;
   identifying a third image, wherein the third image is captured at a fourth time, the fourth time being later than the third time; and
   associating the first metadata of the first image and the second metadata of the second image with the third image.

6. The method of claim 1, wherein the first metadata of the first image is distinct from a second metadata of the first image, wherein the second metadata of the first image comprises data descriptive of the first image.

7. The method of claim 1, further comprising:
   transforming the information to form the first metadata of the first image.

8. The method of claim 7, wherein the transforming comprises modifying a form of a data attribute in the information.

9. The method of claim 7, wherein the transforming comprises encrypting a data attribute in the information.

10. The method of claim 1, wherein the collecting the information comprises:
    accessing, using the device, a data source, wherein the data source provides the information related to the first event.

11. The method of claim 10, wherein data source is a component of the device.

12. The method of claim 1, wherein the first event comprises participating in a financial transaction using the device, and wherein a first portion of information related to the financial transaction is stored in the device.

13. The method of claim 12, further comprising:
    obtaining a second portion of the information related to the financial transaction from a source external to the device.

14. The method of claim 1, wherein the first event comprises:
    participating in an online interaction using the device, and wherein a first portion of information related to the online interaction is stored in the device.

15. The method of claim 1, wherein the first event comprises:
    participating in an audio conversation, wherein the audio conversation is recordable using the device.

16. The method of claim 1, wherein the method is embodied in a computer program product comprising one or more computer-readable tangible storage devices and computer-readable program instructions which are stored on the one or more computer-readable tangible storage devices and executed by one or more processors.

17. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

18. A computer program product for saving event information in image metadata, the computer program product comprising:
one or more computer-readable tangible storage devices;
program instructions, stored on at least one of the one or more storage devices, to detect, using a processor and a memory in a device, at a first time, a first event, the first event being a non-photographic event, and the first time being a time when no image capturing activity is occurring using the device;
program instructions, stored on at least one of the one or more storage devices, to collect information related to the first event;
program instructions, stored on at least one of the one or more storage devices, to detect, at a second time, a first image being captured by the device, the second time being later than the first time, and wherein the first image is chronologically a next discrete image to be captured after the event has transpired; and
program instructions, stored on at least one of the one or more storage devices, to associate, as first metadata of the first image, the information related to the non-photographic first event, wherein the first metadata is unrelated to a content of the first image, wherein the first image also has a second metadata of information related to the content of the first image, the second metadata being created by an image capturing technology.

19. The computer program product of claim 18, further comprising:
program instructions, stored on at least one of the one or more storage devices, to determine that the first image is selected for a manipulation that modifies the first metadata;
program instructions, stored on at least one of the one or more storage devices, to save the first metadata of the first image;
program instructions, stored on at least one of the one or more storage devices, to identify a second image, wherein the second image is captured at a third time, the third time being later than the second time; and
program instructions, stored on at least one of the one or more storage devices, to associate the first metadata of the first image with the second image.

20. A computer system for saving event information in image metadata, the computer system comprising:
one or more processors, one or more computer-readable memories and one or more computer-readable storage devices;
program instructions, stored on at least one of the one or more storage devices for execution by at least one of the one or more processors via at least one of the one or more memories, to detect, using a processor and a memory in a device, at a first time, a first event, the first event being a non-photographic event, and the first time being a time when no image capturing activity is occurring using the device;
program instructions, stored on at least one of the one or more storage devices for execution by at least one of the one or more processors via at least one of the one or more memories, to collect information related to the first event;
program instructions, stored on at least one of the one or more storage devices for execution by at least one of the one or more processors via at least one of the one or more memories, to detect, at a second time, a first image being captured by the device, the second time being later than the first time, and wherein the first image is chronologically a next discrete image to be captured after the event has transpired; and
program instructions, stored on at least one of the one or more storage devices for execution by at least one of the one or more processors via at least one of the one or more memories, to associate, as first metadata of the first image, the information related to the non-photographic first event, wherein the first metadata is unrelated to a content of the first image, wherein the first image also has a second metadata of information related to the content of the first image, the second metadata being created by an image capturing technology.

* * * * *